(12) United States Patent
Kritt et al.

(10) Patent No.: US 8,201,086 B2
(45) Date of Patent: Jun. 12, 2012

(54) SPELLCHECKING ELECTRONIC DOCUMENTS

(75) Inventors: Barry Alan Kritt, Raleigh, NC (US); Douglas Alan Law, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1245 days.

(21) Appl. No.: 11/624,390

(22) Filed: Jan. 18, 2007

(65) Prior Publication Data

US 2008/0178076 A1      Jul. 24, 2008

(51) Int. Cl.
G06F 17/00      (2006.01)
(52) U.S. Cl. .................................. 715/257; 715/259
(58) Field of Classification Search .................. 715/257, 715/259, 260
See application file for complete search history.

(56) References Cited

U.S. PATENT DOCUMENTS

| | | | |
|---|---|---|---|
| 5,189,610 A | | 2/1993 | Kaplan et al. |
| 5,608,872 A * | | 3/1997 | Schwartz et al. .............. 709/205 |
| 5,649,222 A * | | 7/1997 | Mogilevsky ................... 715/257 |
| 5,963,205 A * | | 10/1999 | Sotomayor .................... 715/236 |
| 5,963,966 A * | | 10/1999 | Mitchell et al. ............... 715/236 |
| 5,970,492 A * | | 10/1999 | Nielsen ................................. 1/1 |
| 6,012,075 A * | | 1/2000 | Fein et al. ...................... 715/256 |
| 6,081,772 A * | | 6/2000 | Lewis ................................. 704/1 |
| 6,085,206 A * | | 7/2000 | Domini et al. ................. 715/257 |
| 6,088,702 A * | | 7/2000 | Plantz et al. .............. 707/103 R |
| 6,782,510 B1 * | | 8/2004 | Gross et al. .................... 715/257 |
| 6,847,972 B1 * | | 1/2005 | Vernau et al. .......................... 1/1 |
| 7,254,774 B2 * | | 8/2007 | Cucerzan et al. .............. 715/257 |
| 7,440,941 B1 * | | 10/2008 | Borkovsky et al. ................ 707/5 |
| 2002/0044219 A1 * | | 4/2002 | Mitts et al. ..................... 348/465 |
| 2002/0065856 A1 * | | 5/2002 | Kisiel ............................. 707/530 |
| 2004/0003349 A1 * | | 1/2004 | Ostertag et al. ............... 715/514 |
| 2004/0187084 A1 * | | 9/2004 | Berstis ........................... 715/532 |
| 2005/0060651 A1 * | | 3/2005 | Anderson ...................... 715/530 |
| 2005/0223326 A1 * | | 10/2005 | Chang et al. ................... 715/533 |
| 2005/0273840 A1 * | | 12/2005 | Mitts et al. ..................... 725/136 |
| 2006/0230346 A1 * | | 10/2006 | Bhogal et al. .................. 715/530 |
| 2006/0242570 A1 * | | 10/2006 | Croft et al. ..................... 715/517 |
| 2008/0098302 A1 * | | 4/2008 | Roose ............................. 715/257 |
| 2009/0006950 A1 * | | 1/2009 | Gross et al. .................... 715/259 |

FOREIGN PATENT DOCUMENTS

WO      8802886 A1      4/1988

OTHER PUBLICATIONS

IBM, Activating Multiple Spelling Dictionaries Concurrently, 1990.*

(Continued)

*Primary Examiner* — Stephen Hong
*Assistant Examiner* — Ahamed I Nazar
(74) *Attorney, Agent, or Firm* — Yee & Associates, P.C.; Steven L. Bennett (57) ABSTRACT

A computer implemented method, an apparatus, and a computer program product for spellchecking an electronic document. In response to receiving the electronic document, the process parses the electronic document for a set of non-standard words that are absent from a dictionary used by a document editing program. In response to locating the set of non-standard words in the electronic document, the process generates an index that includes, but is not limited to, the set of non-standard words. The process then reviews the electronic document for spelling errors using the generated index.

19 Claims, 5 Drawing Sheets

| 402 | 404 | 406 | 408 | 410 | 412 | 414 | 416 |
|---|---|---|---|---|---|---|---|
| NON-STANDARD WORD (KEY) | STATUS | FIRST ADD AUTHOR | FIRST ADD REVISION # | FIRST ADD DATE | FIRST ACCEPT AUTHOR | FIRST ACCEPT REVISION # | FIRST ACCEPT DATE |
| WORD 1 | PREVIOUSLY IGNORED/ACCEPTED | JOHN SMITH | 1.1 | 12/02/2005 | JOHN SMITH | 1.1 | 12/02/2005 |
| WORD 2 | PREVIOUSLY FOUND IN USER₁ DICTIONARY | JOHN SMITH | 1.1 | 12/02/2005 | JOHN SMITH | 1.1 | 12/02/2005 |
| WORD 3 | PREVIOUSLY FOUND IN USER₂ DICTIONARY | JOHN SMITH | 1.1 | 12/02/2005 | SUE GREEN | 1.2 | 01/06/2006 |
| WORD 4 | NOT YET SPELL CHECKED (DEFERRED) | SUE GREEN | 1.2 | 01/06/2006 | -- | -- | -- |
| ⋮ | ⋮ | ⋮ | ⋮ | ⋮ | ⋮ | ⋮ | ⋮ |
| WORD N | | | | | | | |

400
NON-STANDARD WORD INDEX

OTHER PUBLICATIONS

Weber, OpenOffice.org Writer, Jul. 2004, ISBN-13: 978-0-596-00826-0, pp. 1-240, publisher: O'Reilly Media, Inc.*
Weber, OpenOffice.org Writer, published by O'Reilly Media, Inc., Jul. 2004, ISBN-13: 978-0-596-00826-0, pp. 1-83.*
OpenOffice.org Writer: The Free Alternative to Microsoft Word by Weber, 2004, pp. 1-8.*
Gavin et al. Protext Program, Version 6.7 Word Processor, User Manual, Issue 10, 1996 (v6.7), pp. 1-161.*

* cited by examiner

| NON-STANDARD WORD (KEY) 402 | STATUS 404 | FIRST ADD AUTHOR 406 | FIRST ADD REVISION # 408 | FIRST ADD DATE 410 | FIRST ACCEPT AUTHOR 412 | FIRST ACCEPT REVISION # 414 | FIRST ACCEPT DATE 416 |
|---|---|---|---|---|---|---|---|
| WORD 1 | PREVIOUSLY IGNORED/ACCEPTED | JOHN SMITH | 1.1 | 12/02/2005 | JOHN SMITH | 1.1 | 12/02/2005 |
| WORD 2 | PREVIOUSLY FOUND IN USER$_1$ DICTIONARY | JOHN SMITH | 1.1 | 12/02/2005 | JOHN SMITH | 1.1 | 12/02/2005 |
| WORD 3 | PREVIOUSLY FOUND IN USER$_2$ DICTIONARY | JOHN SMITH | 1.1 | 12/02/2005 | SUE GREEN | 1.2 | 01/06/2006 |
| WORD 4 | NOT YET SPELL CHECKED (DEFERRED) | SUE GREEN | 1.2 | 01/06/2006 | -- | -- | -- |
| ... | ... | ... | ... | ... | ... | ... | ... |
| WORD N | | | | | | | |

400 NON-STANDARD WORD INDEX

SPELLCHECKING ELECTRONIC DOCUMENTS

BACKGROUND OF THE INVENTION

1. Field of the Invention

The present invention relates generally to an improved data processing system, and, in particular, to a method and apparatus for reviewing electronic documents. Still more particularly, the present invention is related to a computer implemented method, an apparatus, and a computer usable program product for reviewing an electronic document for spelling errors.

2. Description of the Related Art

The generation of an electronic document is often a collaborative effort undertaken by a number of different users, such as authors and reviewers. During the course of generating the document, one or more users may add content to the document and/or review the document for spelling errors. The users often rely upon a document editing program referencing a dictionary of commonly used words to assist in the identification of incorrectly spelled words. This dictionary, also called a "standard dictionary," is often a database included in or working in conjunction with a word processing application, such as Microsoft™ Word®.

A document editing program is a program that is often integrated with a word processing application and enables a user to review and modify electronic documents. A document editing program is, for example, the program integrated with Microsoft™ Word® and Corel™ WordPerfect® that enables a user to edit an electronic document and to check the spelling and grammar of an electronic document, among other things. By referencing a standard dictionary, the document editing program can identify an incorrectly spelled word or a non-standard word. A non-standard word is a correctly spelled word, an acronym, or an alphanumeric string of text that is not located in a standard dictionary. Consequently, the spelling of the non-standard word cannot be verified by a document editing program referencing the standard dictionary. The spelling of each such non-standard word is individually verified by a user in this situation. In many document editing programs, upon verifying the spelling of a non-standard word, the user may choose to instruct the document editing program to "ignore" or skip over the non-standard word or to add the non-standard word to the user's personal dictionary. If the non-standard word is added to the user's personal dictionary, the non-standard word will be deemed correctly spelled by the document editing program in subsequent reviews of the document by that particular user.

A personal dictionary, like the standard dictionary, is often a database of words. However, the personal dictionary, which usually includes non-standard words, is stored on a particular user's computer or virtual workspace and is maintained separately from the standard dictionary.

The spelling of the non-standard words already verified by a first user is often re-verified by another user operating a different computer or logged onto a different account because the other user lacks access to the personal dictionary of the first user. This duplication of work is inefficient and decreases productivity, especially as the number of authors and document reviews increases.

One currently implemented solution to this problem employs the use of other dictionaries, such as a site dictionary, in addition to the standard dictionary and the personal dictionary. A site dictionary, which also contains non-standard words, is an electronic dictionary that is accessible to users of a local area network (LAN) and is modifiable by a designated administrator. This solution, however, is cumbersome because of the various dictionaries a user is required to maintain and utilize. Additionally, the multiple dictionaries have the potential to consume an excessive amount of computer resources as the dictionaries continue to grow in size.

Another currently implemented solution to this problem involves the automatic submission of personal dictionary entries to a vendor of a standard dictionary. The vendor adds the personal dictionary entries to the standard dictionary and automatically updates the standard dictionaries of the vendor's customers. The updating process, however, may not be made quickly enough to eliminate the need for duplicating the review of non-standard words contained within the electronic document. Further, the standard dictionary has the potential to grow exponentially large and include so many non-standard words that even blatantly misspelled words are deemed correct. Additionally, such a standard dictionary could also consume valuable computer resources as the standard dictionary increases in size.

The currently used solutions presented above may fail to reduce the amount of duplicated work. In addition, the number and sizes of the dictionaries used may increase and result in undue burden in order to use and maintain the dictionaries.

BRIEF SUMMARY OF THE INVENTION

The present invention relates generally to a computer implemented method, an apparatus, and a computer program product for spellchecking electronic documents. In response to receiving the electronic document, the process parses the electronic document for a set of non-standard words that are absent from a dictionary used by a document editing program. In response to locating the set of non-standard words in the electronic document, the process generates an index that includes, but is not limited to, the set of non-standard words. The process then reviews the electronic document for spelling errors using the generated index.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
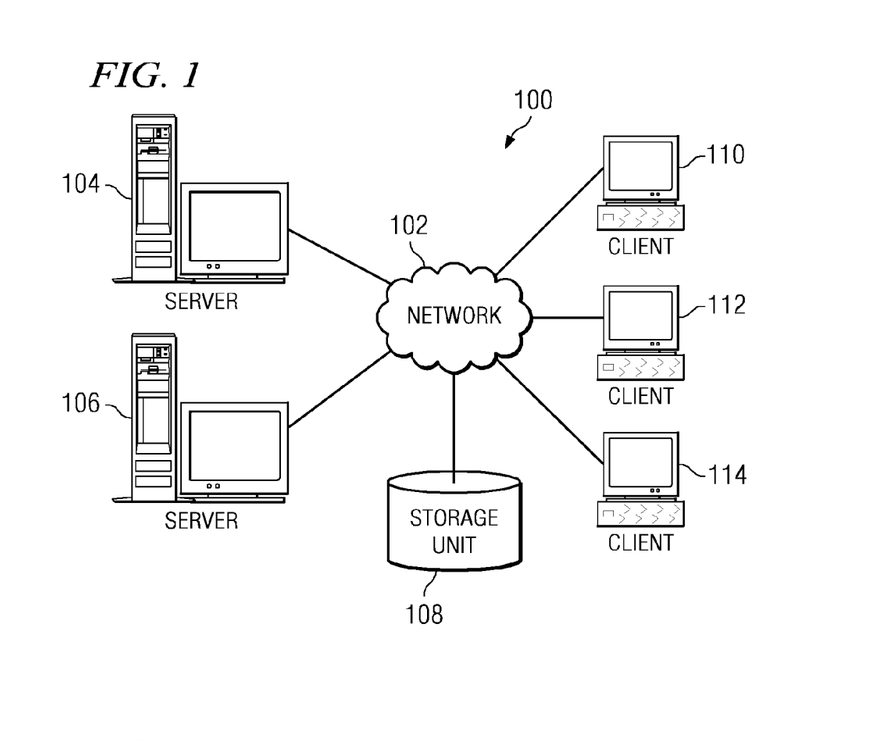
FIG. 1 is a pictorial representation of a network of data processing systems in which illustrative embodiments may be implemented.
Figure 2:
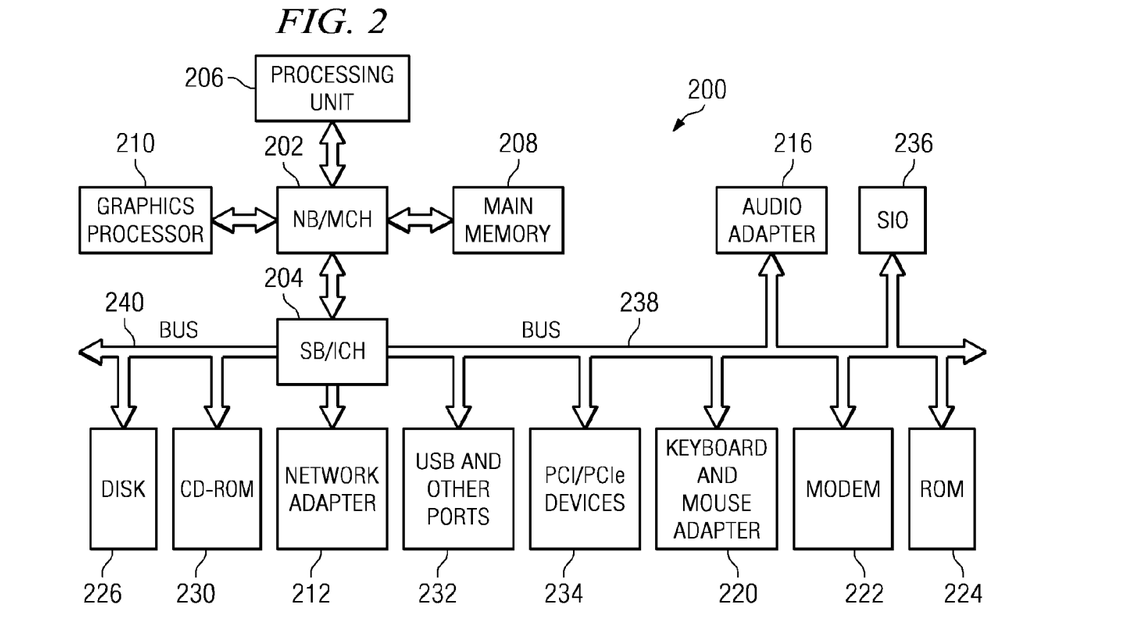
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computing devices in which embodiments may be implemented. Network data processing system 100 contains network 102, which is the medium used to provide communication links between various devices and computers connected together within network data processing system 100. Network 102 may include connections, such as wire, wireless communication links, or fiber optic cables. The depicted example in FIG. 1 is not meant to imply architectural limitations. For example, data processing system 100 also may be a network of telephone subscribers and users.

In the depicted example, server 104 and server 106 connect to network 102 along with storage unit 108. In addition, clients 110, 112, and 114 are coupled to network 102. Clients 110, 112, and 114 are examples of devices that may be utilized for generating and spellchecking electronic documents in a network, such as network 102. Clients 110, 112, and 114 may be, for example, a personal computer, a laptop, a tablet personal computer, and a personal digital assistant (PDA). In the depicted example, server 104 provides data, such as boot files, operating system images, and applications, to clients 110, 112, and 114. Clients 110, 112, and 114 are coupled to server 104 in this example. Network data processing system 100 may include additional servers, clients, electronic devices, and other computing devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), a wide area network (WAN), a telephone network, or a satellite network. FIG. 1 is intended as an example and not as an architectural limitation for different embodiments.

With reference now to FIG. 2, a block diagram of a data processing system is shown in which illustrative embodiments may be implemented. Data processing system 200 is an example of a computing device, such as server 104 and clients 110, 112, and 114 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object-oriented programming system, such as the Java programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the illustrative embodiments may be performed by processing unit 206 using computer implemented instructions, which may be located in a memory such as, for example, main memory 208, read only memory 224, or one or more peripheral devices.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and the above-described examples are not meant to imply architectural limitations. For example, data processing system 200 also may be a tablet computer, a laptop computer, or a telephone device in addition to taking the form of a PDA.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

The illustrative embodiments described herein provide a computer implemented method, an apparatus, and a computer usable program product for reviewing an electronic document for spelling errors. In response to receiving the electronic document, the process parses the electronic document for a set of non-standard words that are absent from a dictionary used by a document editing program. In response to locating the set of non-standard words in the electronic document, the process generates an index that includes, but is not limited to, the set of non-standard words. The process then reviews the electronic document for spelling errors using the generated index. In reviewing the electronic document, the process compares the words of the electronic document to a set of words to determine if the words, acronyms, or strings of text of the electronic document are correctly spelled.

The generated index is an index of non-standard words and can take the form of a spreadsheet, a table, or a database. The generated index includes a record for each non-standard word located in the electronic document. Each record also includes of a number of fields containing information usable by a document editing program, in conjunction with a standard dictionary, to identify a set of non-standard words for spellchecking.

A set of non-standard words is one or more words that are not found in a standard dictionary used by a document editing program. The set of non-standard words and any associated information is added to a non-standard word index or a user's personal dictionary during the course of spellchecking or saving an electronic document. In an alternative embodiment, non-standard words may be copied into the non-standard word index from one or more personal dictionaries. Similarly, non-standard words may be copied from a non-standard word index to a user's personal dictionary.

Figure 3:
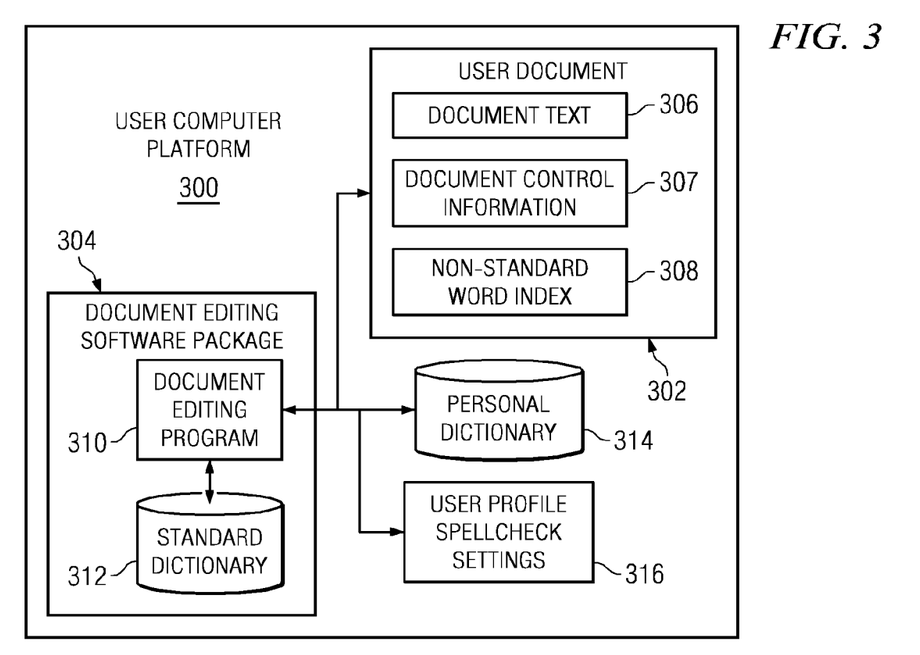
FIG. 3 is a block diagram of a data flow through components of an apparatus for spellchecking an electronic document in accordance with an illustrative embodiment.

FIG. 3 depicts a block diagram of a data flow through components of an apparatus for spellchecking an electronic document in accordance with an illustrative embodiment. In this illustrative embodiment of FIG. 3, user computer platform 300 is a computing device, such as server 104 or client 110 of FIG. 1.

A user (not shown) operates user computer platform 300 to create and modify user document 302 in this example. User document 302 is created by a word processing application (not shown) that usually includes a document editing software package, such as document editing software package 304. Document editing software package 304 may be a collection of software programs usable for reviewing and editing documents.

In this illustrative embodiment, user document 302 includes document text 306, document control information 307, and non-standard word index 308. Document text 306 contains, for example, the alphanumeric characters, words, and symbols that are generated by an author of user document 302. Document control information 307 is a collection of information that may include, for example, a list of authors working on the document, available document revision numbers, dates on which the document was revised, and change tracking information. Document control information 307 may be a database, a table, or, in the simplest embodiment, a list. In one embodiment, the information contained within document control information 307 is copied into the corresponding fields of non-standard word index 308. In an alternative embodiment, the information contained within document control information 307 may be stored directly in non-standard word index 308.

Non-standard word index 308 stores a collection of records, each of which includes a non-standard word and additional predefined information used to facilitate the spellchecking of document text 306. For example, in addition to the non-standard word, non-standard word index 308 may include information identifying the spellcheck status of the non-standard word, the author who first generated the non-standard word, the date on which the non-standard word was first added to the document, and the date and author who first verified the proper spelling of the non-standard word.

In one embodiment, the information contained within non-standard word index 308 is inserted into non-standard word index 308 by document editing program 310. Document editing program 310 parses the words of document text 306 to identify a set of non-standard words. In one embodiment, this parsing process may entail comparing the words of document text 306 to the words contained in standard dictionary 312. Any words, acronyms, or other alphanumeric characters or text strings not present in standard dictionary 312 are deemed to be non-standard words. Document editing program 310 may then generate non-standard word index 308 by creating a database, index, or a list of non-standard words. Document editing program 310 may also remove a non-standard word from non-standard word index 308 if, for example, the non-standard word turns out to be a misspelled word. Once non-standard word index 308 has been generated, document editing program 310 may then use non-standard word index 308 to review a document for spelling errors.

Document editing program 310 may also add non-standard words of document text 306 to a user's personal dictionary 314. Non-standard words may be added to personal dictionary 314 during a spellchecking of document text 306, or after a file save operation has been requested by a user. In an alternative embodiment, the non-standard words may be added to personal dictionary 314 during the course of generating document text 306. For example, document editing program 310 may notify an author of document text 306 that a word is not contained within standard dictionary 312 immediately upon typing the word. At that instant, the author may choose to add the word to personal dictionary 314 by, for example, right clicking on the word and selecting an option to add the word to personal dictionary 314.

When a user wants to spellcheck document text 306, the user may want to automatically accept as correctly spelled any non-standard words that have been deemed correctly spelled by other users. Non-standard words are deemed correctly spelled if the word is located in a user's personal dictionary, or if a user previously directed document editing program 310 to "ignore," or skip the word because the spelling of the word was verified. Alternatively, a user desiring to spellcheck document text 306 may desire to customize the spellchecking filtering rules in order to facilitate and customize the spellchecking process. The user may input one or more spellcheck filtering rules at a graphical user interface, such as graphical user interface 500 of FIG. 5. The selection of filtering rules may be stored in user profile spellcheck settings 316. User profile spellcheck settings 316 may be a database, for example, containing the spellcheck filtering rules selected by the user. The filtering rules enable document editing program 310 to identify a set of non-standard words as potentially misspelled. For example, a user may wish to review only the words that were added to document text 306 after a specified date and by a specified author. By referencing the spellchecking filtering rules, document editing program 310 can identify only those non-standard words that satisfy the filtering rule criteria.

Although user document 302, document editing software package 304, personal dictionary 314, and user profile spellcheck settings 316 are depicted in FIG. 3 as stored on user computer platform 300, in an alternative embodiment, user document 302, document editing software package 304, personal dictionary 314, and user profile spellcheck settings 316 may be stored in a remote storage device, such as storage 108 of FIG. 1, and may be accessible to a user operating user computer platform 300, or another remote computing device, by means of a network adapter (not shown). The network adapter may be, for example, a modem, a wireless network card, an Ethernet card, or any device capable of allowing user computer platform 300 to interact with other computing devices or data processing systems through intervening private or public networks.

Figure 4:
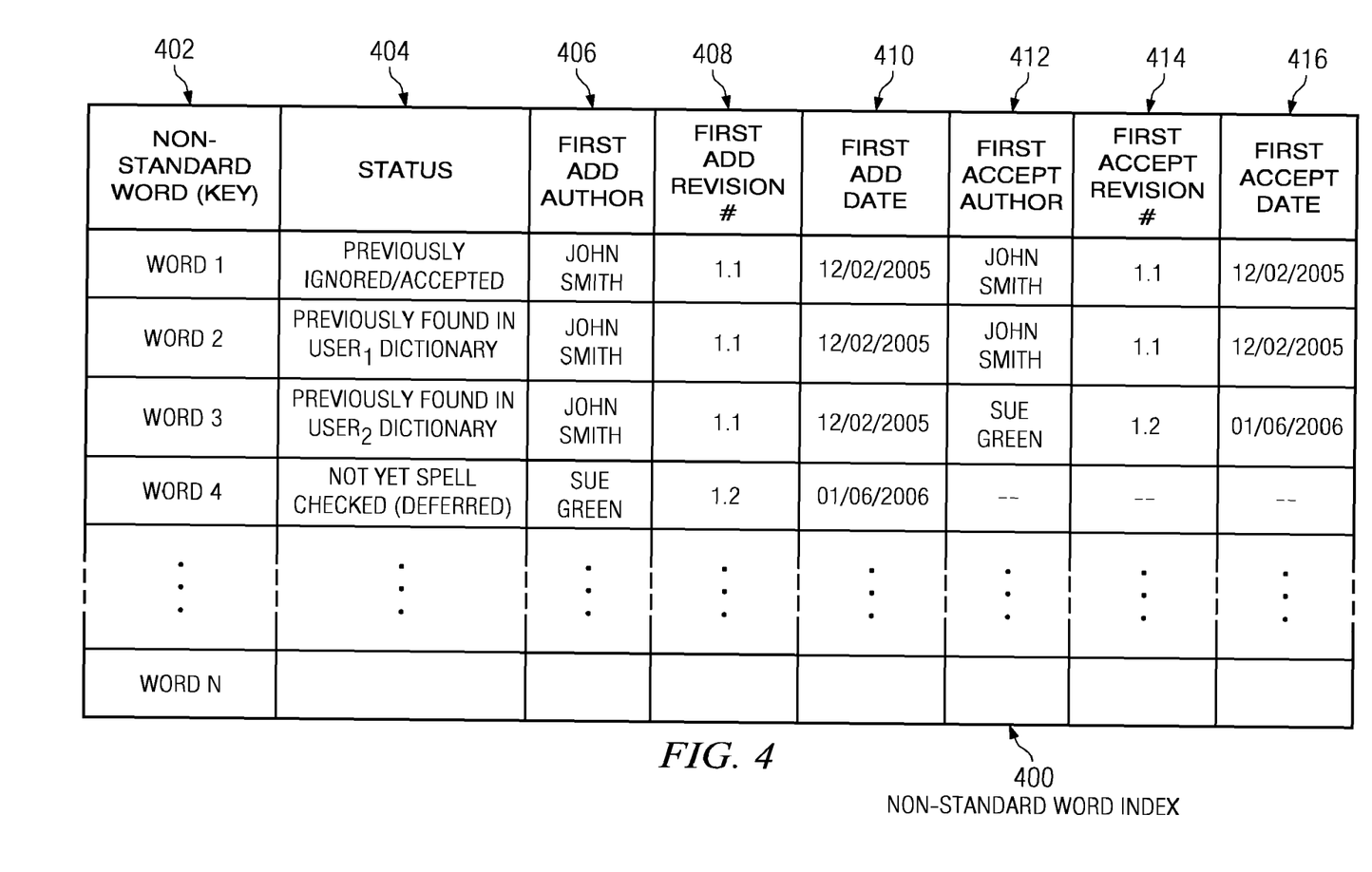
FIG. 4 is a non-standard word index for use in spellchecking an electronic document in accordance with an illustrative embodiment.

Referring now to FIG. 4, a non-standard word index for use in spellchecking an electronic document is depicted in accordance with an illustrative embodiment. Non-standard word index 400 is a non-standard word index such as non-standard word index 308 of FIG. 3 which is embedded in a user document, such as user document 302 of FIG. 3.

The purpose of non-standard word index 400 is the storage of information to facilitate the spellchecking of an electronic document. In one embodiment, the information stored in non-standard word index 400 is generated during the course of spellchecking the document using a document editing program, such as document editing program 310 of FIG. 3. In addition, the information of non-standard word index 400 may be generated upon saving a document that has not yet been spellchecked.

The non-standard words and their associated fields may be copied into non-standard word index 400 dynamically as soon as the word is typed or at predetermined operations, such as during a spellcheck or upon receiving a request for a file save. In another embodiment, all the non-standard words of a user's personal dictionary may be copied to non-standard word index 400.

In another illustrative embodiment, a subset of words from a user's personal dictionary can be copied to non-standard word index 400. For example, non-standard words originating from a common document are often related and may appear together in subsequently generated documents. Thus, when a document editing program adds non-standard words of a first document to a user's personal dictionary, the non-standard words of that document may be copied into the personal dictionary with a common identifier indicating that the non-standard words originated from a common document. In this manner, a subset of non-standard words is formed in a user's personal dictionary. The common identifier can be any kind of identifier, such as a combination of numbers, letters, or symbols that would allow a document editing program to identify those non-standard words that originated from the same document.

If, during the creation of a second document, the document editing program identifies or otherwise matches a word in non-standard word index 400 with a word within a personal dictionary, and the word within the personal dictionary has a common identifier associating it with other words in the personal dictionary, then the document editing program could copy the subset of non-standard words having the common identifier to non-standard word index 400.

The addition of the subset of non-standard words from a user's personal dictionary pre-populates the non-standard word index with words that are more likely to be added in the future. These words are identified in the index as being correctly spelled. As a result, additional authors who subsequently add one or more words of the subset of non-standard words to the document do not have to verify the spelling of these pre-populated words. In this manner, the size of non-standard word index 400 can be limited, and the chance that confidential words are disclosed is minimized. Additionally, non-standard words of a personal dictionary having the greatest probability of being included in the second document are added to non-standard word index 400.

Non-standard word index 400 may consist of any number of fields greater than or less than the depicted number of fields. In the illustrative embodiment depicted in FIG. 4, non-standard word index 400 contains a number of records corresponding to each unique occurrence of a non-standard word in the electronic document. One record is stored per row. Each record further includes additional information in one of eight depicted fields. A field corresponds with one column.

Field 402, labeled as "non-standard word (key)," serves as the key field for non-standard word index 400. A key field consists of one or more entries, such as numbers, words, symbols, or any combination thereof, which are used to identify a unique record in a table. In this embodiment, non-standard word column 402 includes words 1 through N, which are the unique non-standard words of the electronic document.

Field 404, labeled as "status," consists of information indicating the status of the corresponding non-standard word of field 402. Field 404 can contain any number of predefined status descriptions. For example, in the illustrative embodiment of FIG. 4, the status description corresponding to word 1 is, "previously ignored/accepted." This status description indicates that a user has, in a prior spellcheck, determined that word 1 was deemed correctly spelled, but did not select to have the word added to the user's personal dictionary.

The status description corresponding to Word 2 is "previously found in user$_1$ dictionary." This status description indicates that Word 2 was located in a user's personal dictionary. A subsequent user can determine which user's personal dictionary Word 2 was found by referencing field 412, the "first accept author" field. For example, Word 2 was first located in the personal dictionary of John Smith. Similarly, the status of Word 3 indicates that Word 3 was identified as correctly spelled because it was also located in a personal dictionary.

The status description of Word 4 is "not yet spellchecked (deferred)." This status description is given to a word when a user is uncertain of the correct spelling of the non-standard word and chooses to defer the verification of the word's spelling during spellchecking in anticipation that another user will be able to review the word and verify the spelling. This status description is also given to a non-standard word when a user saves the document without performing a spellcheck on a subsequently added non-standard word.

Field 406, labeled "first add author" in this illustrative embodiment, contains the name of the author who first created the word in the electronic document. Thus, for example, John Smith was the author who created the non-standard word represented by "Word 1." Likewise, field 408, labeled "first add revision #", includes information identifying the document revision number in which the non-standard word first appeared. For example, Word 1 was first added to document revision number 1.1 by John Smith.

Field 410, labeled "first add date," indicates the date on which the non-standard word was first added to the electronic document. Field 412, labeled "first accept author," identifies the user who first verified the proper spelling of the non-standard word. The spelling of the non-standard word is verified if either the word is found in the author's personal dictionary, or if the author skips the word during a spellchecking operation. In this example, John Smith verified the spelling of Word 1, which he also created.

Field 414 is labeled as "first accept revision #". Field 414 indicates the revision number in which an author or reviewer verified the proper spelling of the non-standard word. In this example, John Smith first accepted the spelling of Word 1 in revision number 1.1. Field 416 is labeled as "first accept date." Field 416 indicates the date on which an author or reviewer first accepted the spelling of the non-standard word. In this example, John Smith first accepted the spelling of Word 1 on Dec. 2, 2005.

Non-standard word index 400 can have greater or fewer columns than the eight columns depicted. Although not shown, non-standard word index 400 may include additional fields, such as, for example, a field indicating the number of times the non-standard word appears in the document. Furthermore, non-standard word index 400 may also include additional columns for identifying subsequent authors who have accepted a spelling of a word. Additionally, non-standard word index 400 may include a field for user-inputted comments. User-inputted comments may be generated during a first spellcheck, for example, in order to clarify the use or existence of a particular non-standard word. The user-inputted comment may also be presented to a subsequent author or reviewer, for example, when that individual scrolls the mouse pointer over the word.

Non-standard word index 400 may be used by a document editing program in order to facilitate subsequent spellchecks of the associated document by other users, such as a subsequent author or reviewer. In an illustrative embodiment, the non-standard words that have been previously accepted as correctly spelled, either because the word was found in a user's personal dictionary or was skipped during a previous spellcheck, are identified as correctly spelled in a subsequent spellcheck. However, words that have not been spellchecked, such as non-standard words that have been added to the document after a spellcheck has been completed, and words deferred during a spellcheck, are identified as potentially misspelled.

In an alternate embodiment, users may select specific spellcheck filtering rules to include or exclude sets of non-standard words for review that satisfy the filtering rule criteria. For example, a user may desire to proofread the document, but may only want to review the spelling of non-standard words added after a certain revision and by a particular author. The user may select spellcheck filtering rules in order to direct a document editing program to identify only those non-standard words that satisfy the filtering rule criteria. The filtering rules are entered into a graphical user interface, such as the graphical user interface of FIG. 5.

Non-standard word index 400 is an exemplary implementation of an index of non-standard words and is not intended to limit the manner in which non-standard word index 400 can be implemented. More or less information may be used depending upon the implemented embodiment. Non-standard word index 400 may be, for example, a database, a spreadsheet, a table, or any other similar structure for managing data. In the simplest form, non-standard word index 400 may be a list of correctly spelled, non-standard words. Furthermore, in this illustrative embodiment as depicted in FIG. 3, non-standard word index 308 is embedded in user document 302 and hidden from an author or reviewer operating user computer platform 300.

Figure 5:
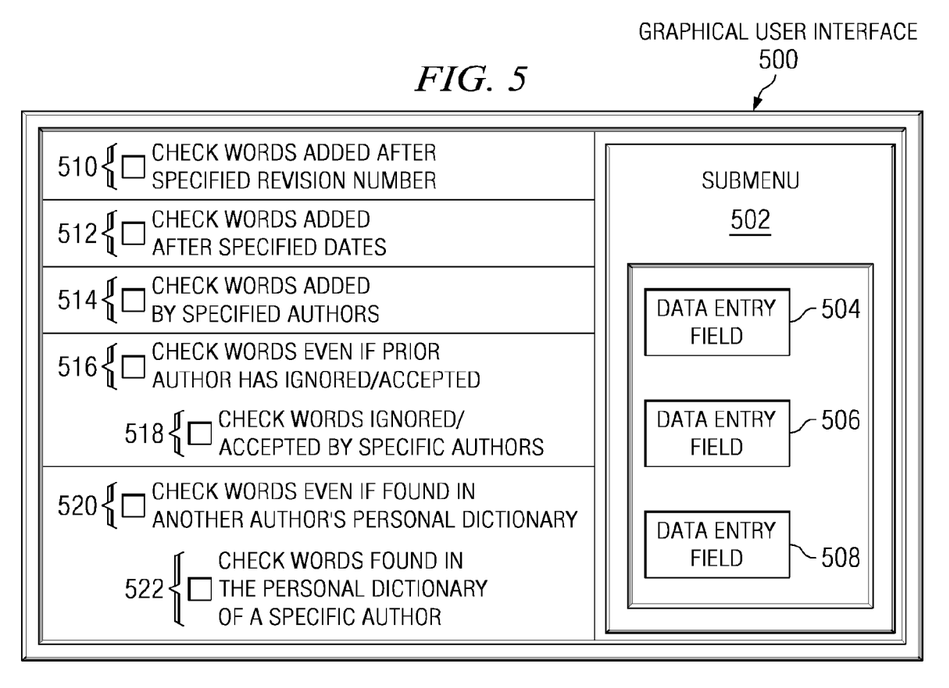
FIG. 5 is a graphical user interface for use in spellchecking an electronic document in accordance with an illustrative embodiment.

Referring now to FIG. 5, a graphical user interface for spellchecking an electronic document is depicted in accordance with an illustrative embodiment. A user interacts with graphical user interface 500 to generate optional spellcheck filtering rules, such as user profile spellcheck settings 316 of FIG. 3. The spellcheck filter rules may be referenced by a document editing program, such as document editing program 310 of FIG. 3, in order to allow the user to specify a set of non-standard words for review during spellchecking.

In the illustrative embodiment depicted in FIG. 5, graphical user interface 500 consists of a plurality of spellcheck filtering rules and submenu 502. The spellcheck filtering rules operate in conjunction with submenu 502 to enable a user to direct a document editing program to identify a set of non-standard words for spellchecking. In particular, submenu 502 further includes data entry fields 504, 506, and 508 which are modifiable by a user in order to further define a filtering rule of graphical user interface 500. For example, where a filtering rule for spellchecking involves specifying a date, data entry field 504 may be a text box in which a user can manually input a string of text corresponding to a desired date. In alternative embodiments, data entry field 504 may also be, for example, a calendar from which a user can select a particular day, a drop down menu of dates corresponding to days in which the document was modified, or a table containing a list of revision dates that selectable by clicking on a button icon or by selecting a checkbox or radio button.

Although submenu 502 is depicted as having three data entry fields, submenu 502 may have as few as one data entry field, or as many data entry fields as there are selected spellcheck filtering rules. Furthermore, submenu 502 may be incorporated in a graphical user interface presented to a user during the process of spellchecking the document. At that time, submenu 502 will present one or more lists containing information selectable by the user in order to further define the spellcheck filtering rules identified in graphical user interface 500. For example, if a user selects filtering rule 510 to specify for review the non-standard words added after a certain revision number, then at the time of spellchecking, data entry field 504 of submenu 502 will present to the user all of the revision numbers for the current document and allow the user to select a document revision number. In this example, the revision numbers for the current document may be presented to the user in the form of a menu drop box.

Selection of filtering rule 512 causes the document editing program to identify for review only those non-standard words of an electronic document that were added after a specified date. As with filtering rule 510, selection of filtering rule 512 requires a user to modify a data entry field to specify a date from which the user wishes to initiate the review for misspelled words.

When selected, filtering rule 514 allows a user to direct a document editing program to identify those non-standard words added by a specified author. The names of the authors can be input into or selected from data entry field 504 at the time the spellcheck is performed.

Selection of filtering rule 516 enables a user to direct a document editing program to identify for review all non-standard words in a document, even if the correct spelling of the non-standard word had been previously skipped by another author. If the non-standard word has been skipped, then the word is given the status of "previously ignored/accepted." Furthermore, if the user desires to review the spelling of those non-standard words skipped by a particular author, then the user can select filtering rule 518. Selection of filtering rule 518 also requires the user to input into or select from data entry field 504 the name or names of the author at the time the spellcheck is performed.

Selection of filtering rule 520 directs a document editing program to identify for review any non-standard word despite the fact that the non-standard word is also in another author's personal dictionary. If the user desires to review the spelling of those non-standard words located in another author's personal dictionary, then the user selects filtering rule 522. Selection of filtering rule 522 also requires the user to input into or select from data entry field 504 the name or names of the author at the time the spellcheck is performed.

Figure 6:
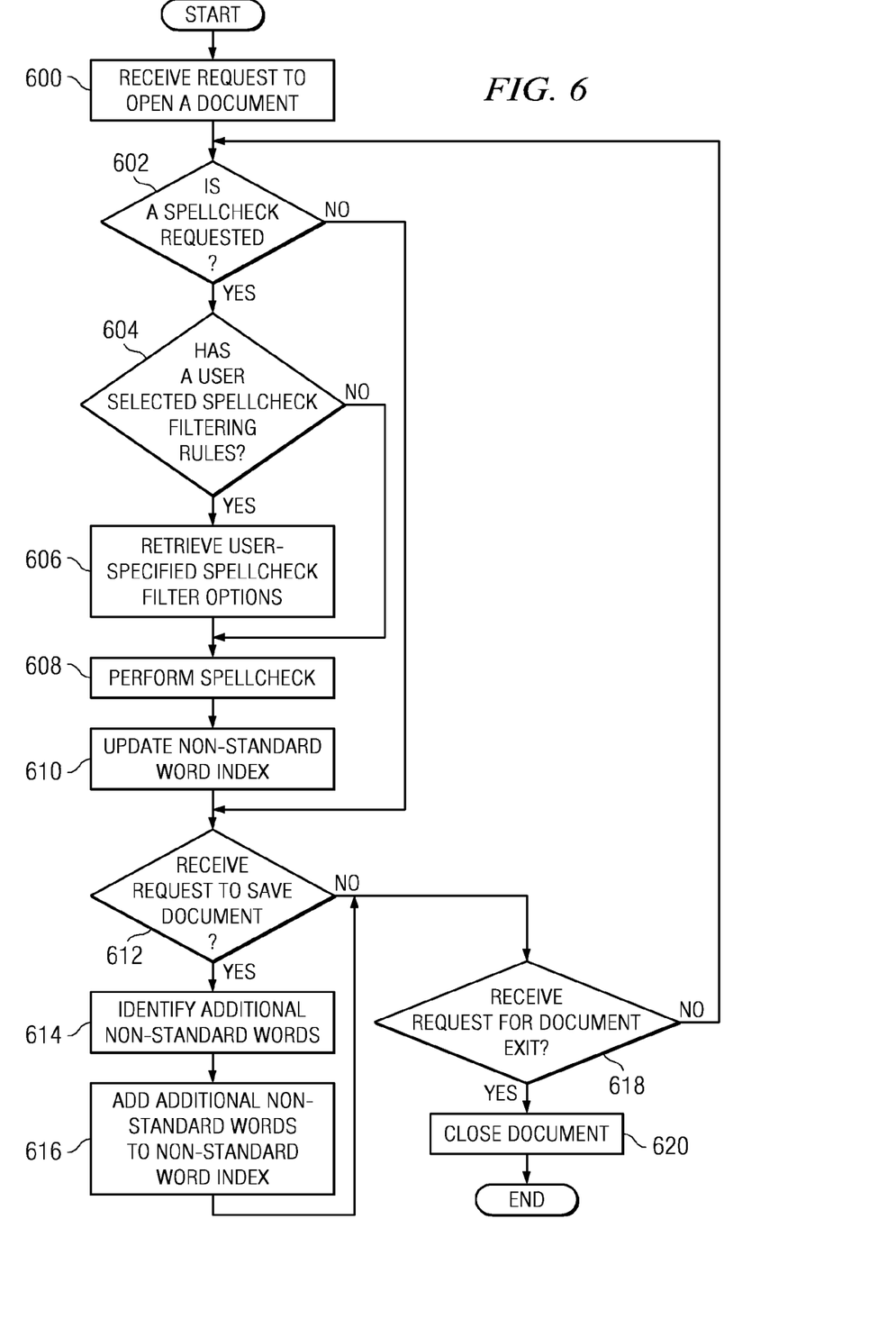
FIG. 6 is a flowchart of a process for spellchecking non-standard words in an electronic document in accordance with an illustrative embodiment.

Referring now to FIG. 6, a flowchart of a process for spellchecking non-standard words in a collaborative document is depicted in accordance with an illustrative embodiment. In this example as shown in FIG. 6, the process is performed by a software component, such as document editing program 310 of FIG. 3.

The process begins by receiving a request to open a document (step 600). The process then makes the determination as to whether a spellcheck is requested (step 602). If the process determines that a spellcheck is requested (yes output to step 602), then the process makes the determination as to whether a user has selected one or more spellcheck filtering rules (step 604). If the process makes the determination that a user has selected one or more spellcheck filtering rules (yes output to step 604), then the process retrieves user-specified spellcheck filter options (step 606). The process then performs the spellcheck in accordance with the spellcheck filtering rules (step 608). The process then updates the index of non-standard words with entries for each new non-standard word and each existing non-standard word which has been verified for the first time. The process updates all relevant fields, including, for example, the status, the first add author, the first add revision #, and the first add date (step 610).

The process then makes the determination as to whether a request to save the document has been received (step 612). In response to receiving a request to save the document (yes output to step 612), the process identifies any additional non-standard words that may have been added to the document after the spellcheck has been performed (step 614). The process then adds the additional non-standard words and all associated information, such as status, first add author, first add revision #, and first add date, to the index of non-standard words (step 616). In this example, for non-standard words added subsequent to a spellcheck, the "status" field will indicate that the non-standard word is "not yet spell checked (deferred)".

Thereafter, the process makes the determination as to whether a request for exiting the document has been received (step 618). In response to receiving a request to exit the document (yes output to step 618), the process closes the document (step 620) and the process terminates thereafter. If the process makes the determination that a request for exiting the document has not been received (no output to step 618), then the process returns to step 602.

Returning now to step 602, if the process makes the determination that a request for spellcheck is not requested (no output to step 602), then the process proceeds to step 612.

Returning now to step 604, if the process makes the determination that a user has not selected any spellcheck filtering rules (no output to step 604), then the process proceeds to step 608.

Returning now to step 612, if the process does not receive a request to save the document (no output to step 612), then the process continues to step 618.

Figure 7:
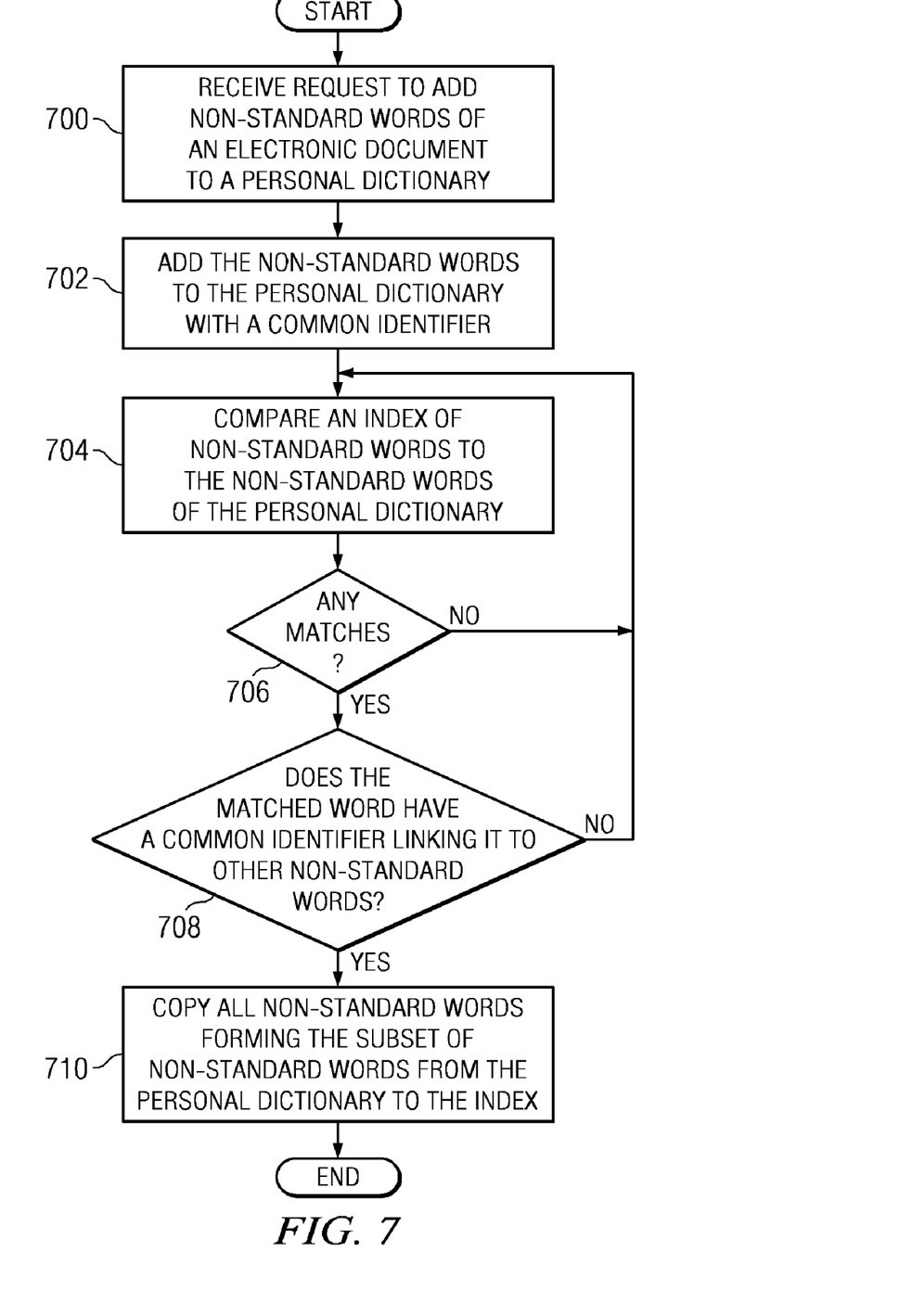
FIG. 7 is a flowchart of a process for adding a subset of non-standard words from a personal dictionary to a non-standard word index in accordance with an illustrative embodiment.

Referring now to FIG. 7, a flowchart of a process for adding a subset of non-standard words from a personal dictionary to a non-standard word index is depicted in accordance with an illustrative embodiment. In this example as shown in FIG. 7, the process is performed by document editing program 310 of FIG. 3.

The process begins by receiving a request to add non-standard words of a first electronic document to a personal dictionary (step 700). The process adds the non-standard words to the personal dictionary with a common identifier (step 702). The common identifier can be any word, number, symbol, or combination thereof that can be used to indicate that the non-standard words of this document originated from the same document.

During a spell check of a second electronic document, the process compares the second document's index of non-standard words with the words in the user's personal dictionary (step 704). The process then makes the determination as to whether any non-standard words in the non-standard word index of the second document match a non-standard word located in the personal dictionary (step 706). If the process makes the determination that a match exists (yes output to step 706), then the process makes the determination as to whether the matched word located within the personal dictionary has a common identifier linking it to other non-standard words in the personal dictionary (step 708).

If the process makes the determination that the matched word does have a common identifier linking it to other non-standard words in the personal dictionary and is thus one word within a subset of non-standard words (yes output to step 708), then the process copies all non-standard words forming the subset of non-standard words from the personal dictionary to the index of non-standard words (step 710), and the process terminates thereafter.

In addition, the associated fields of the non-standard word index are also populated. For example, the status field for each newly added word may be given the description, "previously found in user dictionary." Similarly, the fields relating to the first accept author and first accept date are updated. In this embodiment, the "first add" fields are not updated unless and until the non-standard word is incorporated into the document.

Returning to step 706, if the process makes the determination that a match does not exist (no output to step 706), the process returns to step 704.

Returning to step 708, if the process makes the determination that the matched word of the personal dictionary has no associated common identifier and is not one of a subset of non-standard words (no output to step 708), then the process returns to step 704.

The process described in FIG. 7 pre-populates a non-standard word index with words that have a greater likelihood of relation to the subject matter of the second document. For example, a first medical document describing eye surgery may include non-standard words identifying the specialized tools necessary to perform the surgery, the various drugs required to sedate and anesthetize a patient, and the various structures of the eye. After addition to a user's personal dictionary, these non-standard words are associated with a common identifier to form a subset of words relating, in this example, to eye surgery. Consequently, in a second medical document describing tools necessary for performing eye surgery, the subset of non-standard words originating from the first medical document may be copied from the personal dictionary to the non-standard word index of the second document in order to anticipate the possible inclusion of non-standard words relating to eye surgery by subsequent authors. Furthermore, because these words originated from a user's personal dictionary, subsequent spellchecking will not identify the words as incorrectly spelled unless a user selects a filtering rule encompassing these non-standard words.

Thus, the illustrative embodiments described herein provide a computer implemented method, an apparatus, and a computer usable program product for reviewing an electronic document for spelling errors. In response to receiving the electronic document, the process parses the electronic document for a set of non-standard words that are absent from a dictionary used by a document editing program. In response to locating the set of non-standard words in the electronic document, the process generates an index that includes, but is not limited to, the set of non-standard words. The process then reviews the electronic document for spelling errors using the generated index.

Using the method and apparatus described herein, one or more authors or reviewers of the electronic document can easily and efficiently review the spelling of non-standard words by operating a document editing program that references an index of non-standard words along with a standard dictionary. In addition, a user may select one or more spellcheck filtering rules to identify a set of non-standard words for review. Thus, users are not required to duplicate work previously performed by others, thereby increasing their productivity. Furthermore, computer system resources are preserved by eliminating the need to maintain multiple dictionaries or standard dictionaries that are continually expanding and sometimes including undesired words.

The flowchart and block diagrams in the figures illustrate the architecture, functionality, and operation of some possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed:

1. A computer implemented method for spellchecking an electronic document by a document editing program using a standard dictionary, the computer implemented method comprising:
   responsive to receiving the electronic document, parsing the electronic document for a set of non-standard words, wherein the set of non-standard words are absent from the standard dictionary used by the document editing program;
   responsive to locating the set of non-standard words in the electronic document, generating an index comprising the set of non-standard words to form a generated index, wherein the generated index includes a record for each one of the set of non-standard words in the electronic document, wherein the record includes information identifying a spellcheck status of a respective non-standard word, and wherein the generated index is embedded in the electronic document; and
   reviewing the electronic document for spelling errors using the generated index.

2. The computer implemented method of claim 1 further comprising:
   receiving a set of filtering rules; and
   reviewing the electronic document for spelling errors according to the set of filtering rules, wherein the set of filtering rules indicates which non-standard words in the generated index to identify as potentially misspelled.

3. The computer implemented method of claim 1 further comprising:
   responsive to confirming the set of non-standard words as being previously ignored during a previous spellcheck operation of the electronic document, identifying the set of non-standard words in the electronic document as being correctly spelled.

4. The computer implemented method of claim 1 further comprising:
   responsive to locating the set of non-standard words in a first personal dictionary, adding the set of non-standard words of the generated index to a second personal dictionary, wherein the first personal dictionary is a personal dictionary of a previous user, and wherein the second personal dictionary is a personal dictionary of a subsequent user.

5. The computer implemented method of claim 2, wherein the step of reviewing the electronic document for spelling errors further comprises:
   identifying, according to the set of filtering rules, the set of non-standard words created by a selected user, wherein the set of filtering rules override the spellcheck status for the non-standard words that is maintained in the generated index, wherein the spellcheck status is derived from a previous spellcheck of the electronic document.

6. The computer implemented method of claim 2, wherein the step of reviewing the electronic document for spelling errors further comprises:
   identifying, according to the set of filtering rules, the set of non-standard words created in a selected document revision, wherein the set of filtering rules override the spellcheck status for the non-standard words that is maintained in the generated index, wherein the spellcheck status is derived from a previous spellcheck of the electronic document.

7. The computer implemented method of claim 1, wherein the record comprises:
   a first field comprising the respective non-standard word; and
   a second field comprising the spellcheck status of the non-standard word, wherein the spellcheck status is derived from a previous spellcheck of the electronic document.

8. The computer implemented method of claim 1 further comprising:
   adding a subset of non-standard words of a personal dictionary to the generated index, wherein the subset of non-standard words comprises only non-standard words previously identified with at least one non-standard word of the generated index as determined by a common identifier associated with certain ones of the previously identified non-standard words that is maintained in the personal dictionary, wherein the common identifier indicates that the certain ones of the non-standard words originated from a common document.

9. The computer implemented method of claim 8, wherein the previously identified non-standard words are indicated as being correctly spelled in the generated index.

10. A method for adding a subset of non-standard words of a personal dictionary to an index of non-standard words, the method comprising:
    responsive to receiving a request to add a plurality of non-standard words to the personal dictionary associated with a particular user, adding the plurality of non-standard words to the personal dictionary, wherein the plurality of non-standard words is associated with a common identifier to form the subset of non-standard words, wherein the common identifier is maintained in the personal dictionary and indicates that the plurality of non-standard words originated from a common document; and
    responsive to locating at least one non-standard word of the index of non-standard words in the personal dictionary, wherein the at least one non-standard word is included in the subset of non-standard words, copying only the subset of non-standard words from the personal dictionary to the index of non-standard words while not copying standard words from the personal dictionary to the index of non-standard words.

11. A computer usable program product comprising:
    a computer usable storage device including computer usable program code for spellchecking an electronic document by a document editing program using a standard dictionary, the computer usable program product further comprising:
    computer usable program code for parsing the electronic document for a set of non-standard words in response to receiving the electronic document, wherein the set of non-standard words are absent from the standard dictionary used by the document editing program;
    computer usable program code for generating an index comprising the set of non-standard words to form a generated index in response to locating the set of non-standard words it the electronic document, wherein the generated index includes a record for each one of the set of non-standard words in the electronic document, wherein the record includes information identifying a spellcheck status of a respective non-standard word, and wherein the generated index is embedded in the electronic document; and
    computer usable program code for reviewing the electronic document for spelling errors using the generated index.

12. The computer usable program product of claim 11 further comprising:
    computer usable program code for receiving a set of filtering rules; and
    computer usable program code for reviewing the electronic document for spelling errors according to a set of filtering rules, wherein the set of filtering rules indicates which non-standard word in the generated index to identify as potentially misspelled.

13. The computer usable program product of claim 11 further comprising:
    computer usable program code for identifying the set of non-standard words in the electronic document as being correctly spelled responsive to confirming the set of non-standard words as being previously ignored during a previous spellcheck operation of the electronic document.

14. The computer usable program product of claim 11 further comprising:
    computer usable program code for adding the set of non-standard words of the generated index to a second personal dictionary responsive to locating the set of non-standard words in a first personal dictionary, wherein the first personal dictionary is a personal dictionary of a previous user, and wherein the second personal dictionary is a personal dictionary of a subsequent user.

15. The computer usable program product of claim 11 further comprising:
    computer usable program code for identifying, according to the set of filtering rules, the set of non-standard words created by a selected user, wherein the set of filtering rules override the spellcheck status for the non-standard words that is maintained in the generated index.

16. The computer usable program product of claim 11 further comprising:
    computer usable program code for identifying, according to the set of filtering rules, the set of non-standard words created in a selected document revision, wherein the set of filtering rules override the spellcheck status for the non-standard words that is maintained in the generated index.

17. The computer usable program product of claim 11, wherein the record comprises:

a first field comprising the respective non-standard word; and a second field comprising the spellcheck status of the non-standard word and wherein the spellcheck status is derived from a previous spellcheck of the electronic document.

18. The computer usable program product of claim 11 further comprising:

computer usable program code for adding a subset of non-standard words of a personal dictionary to the generated index of non-standard words, wherein the subset of non-standard words have been previously identified with at least one other non-standard word of the generated index as determined by a common identifier associated with the previously identified non-standard words that is maintained in the personal dictionary, wherein the common identifier indicates that the certain ones of the non-standard words originated from a common document.

19. A data processing system for spellchecking an electronic document by a document editing program using a standard dictionary, the data processing system comprising:

a storage device, wherein the storage device stores computer usable program code; and a processor, wherein the processor executes the computer usable program code, and wherein the computer usable program code comprises:

program code to parse the electronic document for a set of non-standard words responsive to receiving the electronic document, wherein the set of non-standard words are absent from the standard dictionary used by the document editing program;

program code to generate an index comprising the set of non-standard words to form a generated index in response to locating the set of non-standard words in the electronic document, wherein the generated index includes a record for each one of the set of non-standard words in the electronic document, and wherein the generated index is embedded in the electronic document;

program code to review the electronic document for spelling errors using the generated index;

program code to receive a set of filtering rules; and program code to review the electronic document for spelling errors according to the set of filtering rules, wherein the set of filtering rules indicates which non-standard words in the generated index to identify as potentially misspelled.

\* \* \* \* \*